T. Lovelidge.
Loom.
No. 1,589. Reissued Dec. 15, 1863.
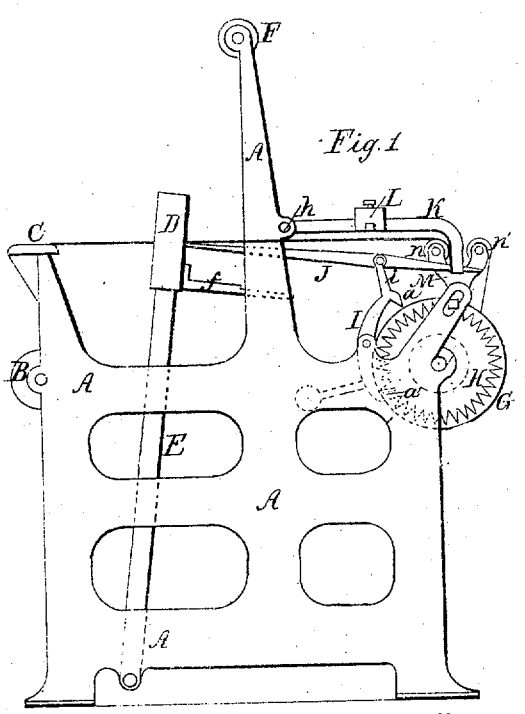
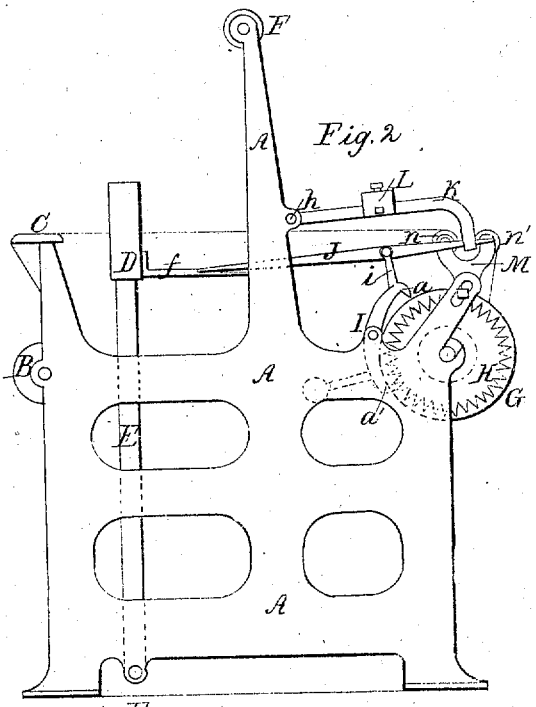
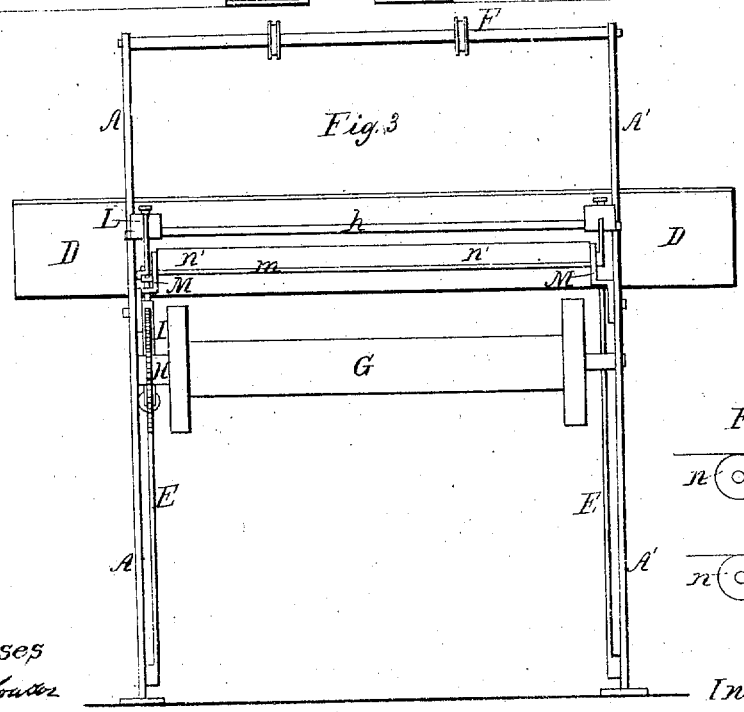
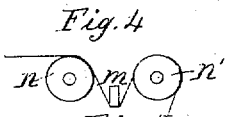
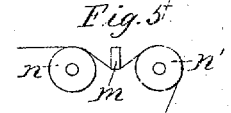
Witnesses
Henry Houston
Chas. Henson.
Inventor
Thomas Lovelidge

UNITED STATES PATENT OFFICE.

THOMAS LOVELIDGE, OF PHILADELPHIA, PENNSYLVANIA.

IMPROVEMENT IN LOOMS.

Specification forming part of Letters Patent No. 27,136, dated February 14, 1860; Reissue No. 1,589, dated December 15, 1863.

*To all whom it may concern:*

Be it known that I, THOMAS LOVELIDGE, of Philadelphia, Pennsylvania, did on the 14th day of February, 1860, obtain Letters Patent of the United States for an Improvement in Looms, which Letters Patent I now de m inoperative and invalid by reason of a defective and insufficient specification; and I do hereby declare the following to be a full, clear, and exact description of the said invention, reference being had to the accompanying drawings, and to the letters of reference marked thereon.

My invention relates to improved yarn-delivering mechanism, which consists of a toothed wheel and a detent-lever, or their equivalents, applied to or operating with the yarn-beam of a power-loom, substantially as described hereinafter, the said mechanism being controlled by the tension of the yarn through the medium of the devices hereinafter set forth, or their equivalents, so as to release with precision and uniformity the exact amount of warp demanded by the take-up motion, while the warp itself is maintained at a uniform tension.

My invention possesses the further advantage of permitting the yarn-beam to be turne l back when required without resorting to the displacement and readjustment of parts and consequent delay demanded in turning back those yarn-beams which are controlled by the usual let off motions.

In order to enable others skilled in this class of machinery to make and use my invention, I will now proceed to describe its construction and operation.

On reference to the accompanying drawings, which form a part of this specification, Figure 1 is a side view of sufficient of an ordinary power-loom to illustrate my improvements; Fig. 2, the same with my improvements in a position differing from that shown in Fig. 1; Fig. 3, a rear view of the loom, and Figs. 4 and 5 diagrams illustrating the operation of my improvements.

Similar letters refer to similar parts throughout the several views.

A and A′ are the two side frames of an ordinary power-loom, connected together at suitable points by appropriate stay-rods. B is the cloth-beam, situated in front of the loom and turning in the opposite frames. C is the breast-beam; D, the "sley," or "lathe," secured to the arms E E, which are hung, one to a pin in one frame and the other to a pin in the opposite frame. F is a spindle for supporting the harness, and G is the warp-beam, hung to the rear of the loom and turning in the opposite frames A and A′. The above-mentioned parts are similar to those of ordinary looms, and therefore requires no further description.

The necessary vibrating motion is imparted to the lathe by the cranked driving-shaft and connecting-rods common to power-looms generally.

To one end of the warp-beam G is secured an escapement-wheel, H, to the teeth of which are adapted the two pointed projections *a* and *a′* of the "pallet" or escapement lever I, which is hung to a pin on one of the side frames, and which has a weighted projection tending to maintain the projection *a′* in and the projection *a* out of gear with the teeth of the wheel. On the upper end of the pallet-lever I, and forming part of the same, is a projecting arm, *i*, to which is hung a lever, J, which will be more particularly alluded to hereinafter. K K′ are two levers secured, one near each end of a shaft, *h*, which is hung loosely to the opposite frames of the loom. Each lever is furnished with a sliding weight, L, which may be adjusted to any desired position, and the bent ends of the opposite levers are connected together by a bar, *m*, which is situated between the two rollers *n* and *n′*, the latter turning in brackets M, one of which is secured to each frame of the loom. The position occupied by the bar *m* in relation to the rollers *n* and *n′* will be best observed on reference to the diagrams, Figs. 4 and 5. One of the weighted arms, K, or the bar *m* near one of these arms, bears on the end of one arm of the lever J, the opposite arm projecting forward toward the rear of the lathe D, to which is secured an arm, *f*.

The warp, which is shown in red lines, passes from the beam G, upward over the roller *n′*, under the bar *m* of the levers K K′, over the roller *n*, thence through the harness, through the usual "reed" in the lathe D, where it is woven, the woven fabric passing over the breast-beam C, and thence to the cloth-roller B, around which it is wound by the usual ratchet-wheel and catch, operated by any moving part of the loom.

The position of the weighted arms K and K′ and their transverse bar *m* depends upon the position assumed by the warp between the two rollers *n* and *n′*, the bar *m* bearing on the warp at this point with a pressure invariably the same. Now, supposing the bar *m* to be in its lowest position between the rollers *n* and *n′*, (see diagram, Fig. 4,) as the fabric is wound round the cloth-beam the warp will be stretched, and as the warp-beam is prevented from turning by the pallet-lever I, excepting on certain occasions referred to hereinafter, the warp, which had been previously depressed between the two rollers, as seen in Fig. 4, will be gradually raised, as seen in Fig. 5, thereby raising the bar *m*, and with it the levers K and K′. Now, the position of the lever J depends upon that of the arm K, against which this lever bears, so that as the bar *m* and its arms are raised the forward end of the lever will be lowered, passing from the position shown in Fig. 1 to that shown in Fig. 2, where it is within the range of the projection *f* on the lathe D. As long as this lever remains elevated above the range of this projection, its position will be undisturbed, and the pallet-lever will continue to prevent the warp-beam from turning, and the warp consequently from escaping.

The necessary amount of warp to take the place of that woven by the lathe and taken up on the cloth-beam is supplied by the gradual rising of that portion of the warp depressed between the two rollers *n* and *n′*. When no more of this depressed warp, however, remains to be delivered out, it becomes necessary to abstract another supply from the warp-beam, and it is at the point where the supply of warp between the rollers is exhausted that the forward end of the lever J comes within the range of the projection *f* of the lathe. This projection strikes the end of the lever, moves the pallet or escapement lever I so that its projection *a′* moves out of gear and the projection *a* into gear with the escapement-wheel H. The moment the projection *f*, by the forward movement of the lathe, is freed from contact with the end of the lever J the weight on the pallet-lever will instantly restore that lever to its original position. On this sudden movement of the pallet-lever the escapement-wheel will be turned around to the extent of one tooth, and a limited amount of warp will be delivered off. This sudden letting off of the warp does not in any way impair that uniform tension which is necessary for the proper weaving of the fabric, for the warp as it is given out will be taken up by the bar *m*, which depresses it between the rollers *n n′*, as before. (See Fig. 4.) At the same time, by the depression of the arms K and K′, the forward end of the lever J will be raised, and will remain beyond the range of the projection *f* until another supply of warp has to be obtained from the beam, which becomes necessary when the supply between the two rollers *n* and *n′* has been expended, in which case a repetition of the above-described movement will take place.

From the foregoing description of my invention it will be seen that my improved letting-off motion consists of an escapement mechanism applied and operating in conjunction with the yarn-beam, the said mechanism being controlled by the tension of the yarn through the devices described, and that this escapement mechanism, controlled as it is by the tension of the yarn, is the means of letting off from the beam the precise amount of warp demanded by the take-up motion, this supply being uniform and regular, and the tension of the warp never varying to any practical disadvantage.

It will be evident, therefore, that my improved letting-off motion or yarn-delivering mechanism possesses an important advantage over those in common use, for the tension of the warp in the latter is wholly controlled by friction imparted to the warp-beam, by means which are well known to those familiar with power-looms, and which are not only uncertain and unequal, but demand frequent stoppages and delays during the process of weaving.

Although I have illustrated and described my invention as applied to an ordinary power-loom, it is equally well adapted to Jacquard and other fancy looms, as well as to ordinary hand and carpet looms. My invention can also be applied with much advantage to that class of knitting and lace machines in which a warp composed of delicate threads and requiring a uniform tension is used.

I do not desire to claim the maintaining of the warp at a uniform tension by means of a movable weighted bar or whip-roller, in combination with two stationary whip-rollers, nor do I claim the letting off of the warp by means of the said movable bar or whip-roller; but

I claim as my invention and desire to secure by Letters Patent—

Yarn-delivering mechanism consisting of a toothed wheel and a detent or escapement lever, or their equivalents, applied to or operating with the yarn-beam, substantially as set forth, when the said mechanism is controlled by the tension of the yarn through the medium of the devices herein set forth, or the equivalents to the same.

In testimony whereof I have signed my name to this specification before two subscribing witnesses.

THOMAS LOVELIDGE.

Witnesses:

ROBERT THOMAS,

W. J. R. DELANG.